United States Patent [19]

Dickmeyer et al.

[11] Patent Number: 5,381,089

[45] Date of Patent: * Jan. 10, 1995

[54] HIGH OUTPUT AND ENVIRONMENTALLY IMPERVIOUS VARIABLE RELUCTANCE SENSOR

[75] Inventors: David A. Dickmeyer; Kenneth G. Maurer, III; Larry L. Redmon, all of Fort Wayne, Ind.

[73] Assignee: Component Sales & Consultants, Inc., Fort Wayne, Ind.

[*] Notice: The portion of the term of this patent subsequent to Jan. 11, 2011 has been disclaimed.

[21] Appl. No.: 179,147

[22] Filed: Jan. 10, 1994

Related U.S. Application Data

[63] Continuation of Ser. No. 888,334, May 22, 1992, Pat. No. 5,278,496.

[51] Int. Cl.⁶ ............... G01P 3/488; H01F 27/02; H01F 27/30; H05K 5/06
[52] U.S. Cl. ................... 324/174; 174/52.3; 324/207.15; 336/92
[58] Field of Search ............ 324/173, 174, 207.15, 324/207.16, 207.25; 73/660, 661; 310/155, 168; 336/92, 98, 110, 221; 174/52.1, 52.2, 52.3

[56] References Cited

U.S. PATENT DOCUMENTS

| | | | |
|---|---|---|---|
| 3,614,615 | 10/1971 | Cass | 324/161 |
| 3,793,545 | 2/1974 | Leiber et al. | 310/168 |
| 4,024,484 | 5/1977 | Tomczak et al. | 336/30 |
| 4,045,738 | 8/1977 | Buzzell | 324/174 |
| 4,166,977 | 9/1979 | Glauert et al. | 324/173 |
| 4,268,771 | 5/1981 | Lace | 310/155 |
| 4,419,646 | 12/1983 | Hermle | 336/90 |
| 4,529,933 | 7/1985 | Bleeke | 324/173 |
| 4,596,973 | 6/1986 | Form et al. | 336/96 |
| 4,626,781 | 12/1986 | Forkel | 324/174 |
| 4,647,892 | 3/1987 | Hewitt | 336/83 |
| 4,652,818 | 3/1987 | Buchschmid | 324/174 |
| 4,680,543 | 7/1987 | Kohen | 324/208 |
| 4,700,133 | 10/1987 | Day | 324/208 |
| 4,804,911 | 2/1989 | Saito et al. | 324/167 |
| 4,829,245 | 5/1989 | Echasseriau | 324/174 |
| 4,847,557 | 7/1989 | Saito et al. | 324/208 |
| 4,849,728 | 7/1989 | Goll et al. | 336/92 |
| 4,922,197 | 5/1990 | Juds et al. | 324/207.21 |
| 4,922,757 | 5/1990 | Rozelle et al. | 73/660 |
| 4,937,522 | 6/1990 | Gee | 324/174 |
| 5,016,343 | 5/1991 | Schutts | 29/605 |
| 5,021,737 | 6/1991 | Schutts | 324/207.11 |
| 5,032,790 | 7/1991 | Johnson | 324/174 |
| 5,039,942 | 8/1991 | Buchschmid et al. | 324/174 |
| 5,121,056 | 7/1992 | Onishi et al. | 324/207.15 |
| 5,278,496 | 1/1994 | Dickmeyer et al. | 324/174 |

*Primary Examiner*—Gerard R. Strecker
*Attorney, Agent, or Firm*—Baker & Daniels

[57] ABSTRACT

A variable reluctance sensor assembly including an open-ended housing which contains a bobbin assembly with an overmolded connector piece. The bobbin contains a ferrous pole piece pressed into a closed-ended cavity within the bobbin, a small disc-shaped rare earth permanent magnet mounted forward of the pole piece, and a magnet wire coil wound upon the bobbin barrel and attached to the customer terminals which carry the output signal. A separate submersible connector is affixed to the integral connector. A front seal ring is stretch fit to the forward flange of the bobbin, and a rear seal ring is stretch fit to the rear section of the sensor housing. The bobbin assembly is slip fit into the housing with magnet forward. Upon the bobbin assembly being initially seated with the magnet in the open magnet pocket of the housing, the connector piece is ultrasonically welded via shear joint to the housing, thereby simultaneously compressing both O-rings, fully seating the magnet into the open pocket in the housing, and fully seating the bobbin assembly into the housing. In an alternative embodiment, a leaded sensor assembly may be provided with a harness holder in place of the connector piece.

6 Claims, 5 Drawing Sheets

HIGH OUTPUT AND ENVIRONMENTALLY IMPERVIOUS VARIABLE RELUCTANCE SENSOR

This is a continuation of application Ser. No. 07/888,334, filed May 22, 1992, and issued as U.S. Pat. No. 5,278,496.

BACKGROUND OF THE INVENTION

The present invention relates generally to packaged electronic sensors, and more particularly to packaged electromagnetic type pickups, also known as magnetic pickups, magnetic sensors, speed sensors, or more accurately variable reluctance sensors. Such sensors are used to measure the rotational speed or the position with respect to a fixed reference of a ferrous exciter rotor or reluctor wheel.

Variable reluctance speed and position sensors are well-known and widely used in automotive applications. A general theory of variable reluctance sensor operation is explained in, for example, U.S. Pat. No. 3,614,615, issued to Cass, and U.S. Pat. No. 4,045,738, issued to Buzzell.

The early automotive applications of variable reluctance sensors were for inputting of speed information for electronic speedometers and tachometers on heavy and medium duty trucks and off-road equipment (agricultural, construction, and recreational). The speed sensors were also used to supply wheel speed information for antiskid braking systems for heavy trucks. In general the sensors comprised a plastic bobbin which housed the magnetic elements (pole piece and magnet) and magnet wire. The bobbin assembly was encapsulated into a metal or plastic housing via injection molding of thermoplastic resins or via transfer molding of thermosetting resins, or the encapsulating material itself served to house the bobbin assembly. The encapsulating process frequently caused damage to the magnet wire which resulted in an "open circuit" failure condition early in field service as temperature cycling caused the damaged magnet wire to break (open circuit).

More recently, applications for variable reluctance sensors have increased. With the advent of more aerodynamic vehicles and the use of four and six cylinder engines at higher rpm's to attain power levels of eight cylinder engines as well as to achieve improved fuel economy, the under hood temperatures are higher. The mounting locations for these sensors in the new applications place them in transmission fluid, engine oil, hydraulic fluid, and salt water which are corrosive materials or carriers of corrosive agents used in the manufacture (machining) of metal parts. Together with longer warranty objectives, these harsher environmental conditions have required more difficult and more accelerated life testing for sensor design validation.

As automotive O.E.M.'s continue to look for ways to meet government mandates for emission levels and fuel consumption and to provide improved vehicle performance and safety to consumers, usage of variable reluctance sensors is mushrooming. Some applications include but are not limited to: direct sensing crankshaft position for spark timing in distributorless ignition systems; direct sensing camshaft position for timing of sequential fuel injection systems; speed input of information for antilock braking systems, electronically controlled transmissions, automatic all wheel drive systems, traction control, as well as the previously mentioned input speed information for instrumentation (vehicle speed and engine speed); and direct sensing of camshaft position for variable camshaft timing systems designed to improve engine horsepower while simultaneously reducing emissions and fuel consumption.

A need for improved sensor reliability and design life is necessitated by the ever increasing warranty periods with targets for warranties out to 100,000 to 200,000 miles as well as by the critical nature of functions performed on vehicles by the sensors as described above. Failure of the variable reluctance sensor will result in vehicle non-operation, safety risk, or poor engine performance in emission control or fuel consumption.

As the warranty periods and use of variable reluctance sensors for critical functions increase, the latent failure modes as well as early failure modes of variable reluctance sensors must be addressed. All the while, the environmental conditions imposed upon these sensors are becoming more demanding.

Further, the output (threshold voltages) requirements are increasingly more difficult to meet because the package size available for the sensors is shrinking with smaller and lighter vehicles. Also, with emission requirements becoming tighter and even required during engine start-up, ignition timing must be achieved during engine start-up which means the same sensor output must be attained at lower exciter gear speeds. This translates to less propensity to induce voltage since the lower the speed of the exciter gear the less the propensity of a given system to induce voltage in a given sensor.

Together with the more critical nature of the applications and the harsher environments, much work has been done to reduce the encapsulation damage to the magnet wire, such as lower molding pressures and/or a provision of protective layering or shielding between the coil and encapsulant. Progress has been made in reducing failure rates; however, the open circuit condition still exists as a result of differing thermal expansion rates of the encapsulant and magnet wire or as a result of the transmission of encapsulant pressure damage through or around the protective layer.

Sealing from liquid intrusion must be provided at all points or surfaces on a variable reluctance sensor including the back and rear end (cable or connector end) of a sensor in applications where complete submersion is possible or where corrosive liquid splash or spill is possible. Many approaches have been taken to seal off the intrusion of corrosive liquids into the sensor. None have been successful in solving the open circuit condition resulting from encapsulation/thermal cycling damage and the sealing off of corrosive liquid intrusion, without sacrificing the output capability of the sensor.

In U.S. Pat. No. 4,680,543, issued to Kohen, a sleeve-like molded plastic cover surrounds the spool (coil), and the magnetic element abuts the inner surface of the cover wall. Further, an encapsulation occupies the spaces within the cover. The thickness of the cover wall increases the working air gap between the exciter rotor and the sensor magnetic element thereby reducing output capability. Also, the sensor coil is still subject to encapsulation/thermal cycle damage to the magnet wire coil. Lastly, although the cover seals off liquid intrusion at the sensing side of the sensor, the design does not provide for an adequate seal from liquid intrusion via the cable.

In U.S. Pat. No. 4,847,557, issued to Saito, et al., the sensor element is covered by a first thermosetting resin inside a case, wherein a second thermoplastic resin hermetically seals the opening in the case. One of the problems with this design is that it does not enable the use of a high coercive force rare earth magnet and thereby does not maximize the output capacity of the sensor. Further, encapsulants are utilized to form seals. In addition to causing magnet wire damage (sensor failure) during thermal cycling, encapsulants have proven to be an ineffective sealing medium during thermal shock or thermal cycles/submersion testing. In other words, this sealing approach has not been sufficient to eliminate intrusion of corrosive liquid into the sensor because the differing thermal expansion rates of the different materials cause any encapsulated material adhesion (sealing) to separate during thermal cycling, thereby creating a leak path.

Although Saito, et al. attempts to employ a seal ring between the bracket and the housing to overcome the separation phenomenon described above, the seal ring only provides a seal for one of three leak paths. The remaining two leak paths are still subject to the separation problem in thermal cycling: 1) between the output wire protective member and the second resin member, and 2) between the magnetic pole and the case, further between the bobbin and the case, and further between the bobbin and first resin member. Penetration of corrosive liquids via the leak paths will result in a shorted coil, resulting in sensor failure.

Consequently, a need exists for a variable reluctance sensor capable of high reliability, not subject to encapsulation damage and impervious to liquid intrusion while maximizing output capability per sensor package volume.

SUMMARY OF THE INVENTION

The present invention overcomes the problems of the above-described prior art sensor designs by providing a packaged electronic sensor housing that sealingly encases the output device of the sensor, yet also exposes the actual sensing component to the physical stimulus being sensed, thereby increasing the sensitivity capabilities of the sensor while protecting the delicate output device from damage caused by both thermal cycling and liquid intrusion.

In general, the invention provides a packaged sensor assembly including a sensing component for sensing a physical stimulus and generating a signal indicative thereof. An output device is connected to the sensing component for transmitting the signal to an external circuit. A housing encases both the sensing component and the output device. The housing includes a front end portion having a front wall with an opening therein to permit the sensing component to be exposed therethrough. The housing is sealed at both the front and rear in such a manner that fluid is prevented from reaching the output device in the interior of the housing.

More specifically, the invention provides, in one form thereof, a variable reluctance sensor having a bobbin including a closed-ended or blind cavity within the barrel portion of the bobbin. A pole piece is press fit into the cavity, and a permanent magnet is attached to a recess at an end of the bobbin adjacent the pole piece. Magnet wire is coiled about the barrel portion, and the start and end wires of the coil are soldered to the ends of terminals that are molded into the bobbin. A terminal connector is molded onto the bobbin and is designed to receive a separate submersible connector. The terminal connector includes a flanged portion. A front sealing O-ring is secured within a recess at the front of the bobbin. A rear sealing O-ring is provided in a groove in an inner flanged portion of a hollow outer shell. The shell is disposed over the bobbin such that the front and rear sealing rings are compressed to prevent the flow of fluid into the sensor interior. The flanged portion of the terminal connector is simultaneously ultrasonically welded with the rear portion of the outer shell to further seal the rear of the sensor. The magnetic element is exposed through an opening in the front wall of the outer shell; however, the flow of fluid through the front of the sensor housing is prevented by the front ring seal and the closed bobbin barrel.

An advantage of the variable reluctance sensor of the present invention is that the front seal ring and closed bobbin barrel enables the magnetic element to be exposed thereby not increasing the working air gap as is sacrificed with closed-ended housing designs.

Another advantage of the variable reluctance sensor of the present invention is that a relatively thin bobbin barrel is provided which reduces the internal magnetic air gap thereby increasing output capability and, in addition, enables small sensor package size as well as more space for the magnet wire coil, which further increases output capability.

A further advantage of the variable reluctance sensor of the present invention is that the magnet pocket in the housing and bobbin enables ease of assembly and assures centering of the magnet which is important for position sensing applications, as well as increases the output capability by reducing the internal magnetic air gap and external working air gap.

Yet another advantage of the variable reluctance sensor of the present invention is the vibrational or mechanical shock capability of the sensor is maintained as compared to conventional encapsulated sensors.

Yet another advantage of the variable reluctance sensor of the present invention is that the bobbin includes wire slots into which the start and finish wires of the magnetic coil fit, thereby protecting the magnet wire against damage in subsequent processing and further providing waste savings and elimination of latent failure mode.

Still another advantage of the variable reluctance sensor of the present invention is that the design requires few and common parts and lends itself to automated process in manufacturing.

Other advantages of the present invention will become apparent as the description proceeds.

The present invention, in one form thereof, provides a sealed sensor assembly including sensing means for sensing a physical stimulus and for generating a signal indicative thereof. An output means is connected to the sensing means for transmitting the signal from the sensing means. A housing contains the sensing means and the output means and includes a rear end portion and a front end portion having a front wall with an opening therein to permit the sensing means to be exposed therethrough. A front sealing means is provided for sealing the output means from fluid flow through the opening. A rear sealing means is provided for sealing the output means from fluid flow through the rear end portion of the shell.

The present invention, in one form thereof, provides a sealed variable reluctance magnetic sensor comprising a bobbin including a barrel portion having a cavity therein. A pole piece is provided in the cavity, and a magnetic element is secured to the bobbin adjacent the pole piece. An electric coil is wound around the barrel.

An outer hollow shell surrounds the coil and includes an open rear end portion and a front end portion having a front wall with an opening therein to permit the magnetic element to be exposed therethrough. A front seal is provided for sealing the electric coil from fluid flow through the opening, and a rear seal is provided for sealing the electric coil from the fluid flow through said rear end portion.

The present invention further provides, in one form thereof, a method of assembly of a sealed variable reluctance magnetic sensor. A bobbin is provided including a barrel portion having a cavity therein. The cavity is accessible from one end of the bobbin. A magnet wire is wound into a coil about said barrel portion. A start wire and a finish wire of the wire coil are attached to respective electrically conductive terminals for electrical output from the coil to an external circuit. A magnetic pole piece is inserted into the cavity, and a magnetic element is placed on the bobbin adjacent the pole piece. A front seal is attached to a front edge of the bobbin to form a bobbin assembly. The bobbin assembly is then inserted into an outer hollow shell having an open rear end portion and a front end portion having a front wall with an opening therein. Thus, the magnetic element is exposed through the opening. In addition, the front seal is compressed between the front wall of the shell and the front edge of the bobbin to form a fluid tight seal therebetween upon inserting the bobbin assembly into the outer hollow shell. A rear seal is provided to seal the rear end of the housing.

DESCRIPTION OF THE PREFERRED EMBODIMENT

Figures 1, 1A, 2:
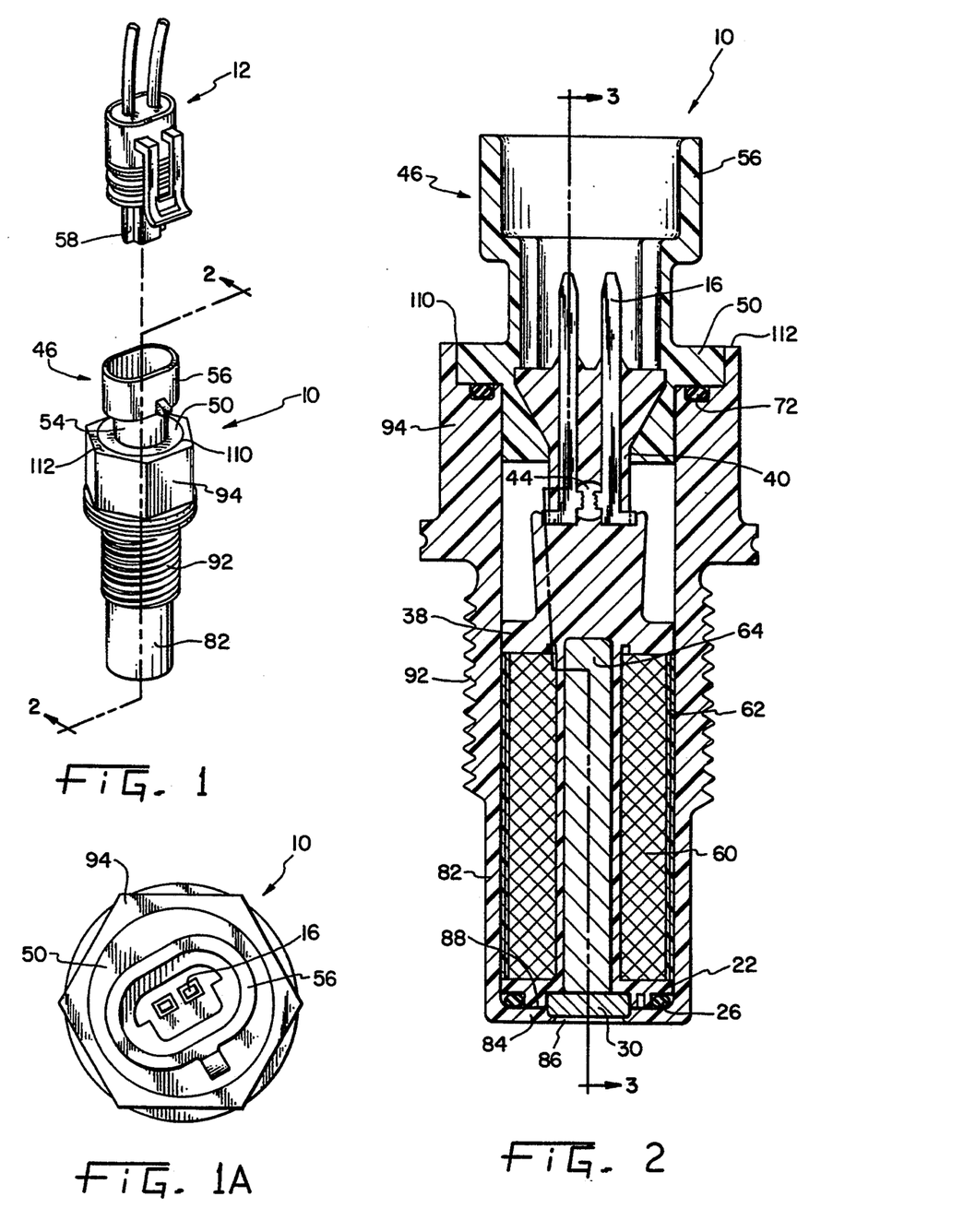
FIG. 1 is a perspective view of a variable reluctance sensor in accordance with the principles of the present invention and further showing a submersible connector for attachment to the variable reluctance sensor.
FIG. 1A is an enlarged end view of the sensor of FIG. 1.
FIG. 2 is an enlarged vertical sectional view of the sensor of FIG. 1, taken along line 2—2 in FIG. 1.

Referring now to the drawings, and in particular to FIG. 1, there is shown a variable reluctance sensor device 10 in accordance with principles of the present invention, and a conventional submersible connector 12 that is attached to sensor device 10. For purposes of the description of the components comprising sensor device 10, the following description will proceed in the order in which sensor device 10 is assembled.

Figure 4:
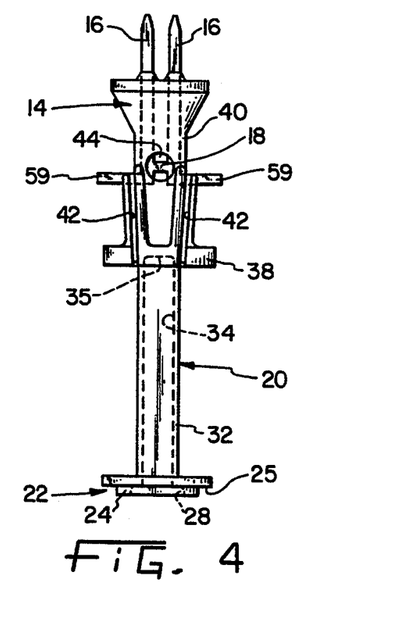
FIG. 4 is an enlarged elevational view of the bobbin assembly of the sensor of FIG. 1 with the terminal insert molded therein.

Referring now to FIG. 4, there is shown a stamping 14 which forms terminals 16 of sensor device 10. Preferably, the stamping is made of CA260 half hard brass which is then tin plated. The plating includes a copper flash to prevent nickel migration out of the brass. Stamping 14 is then mat tin plated 300 to 400 micro inches thick on the tin plate. Stamping 14 further includes a web portion 18 which is provided for ease of loading terminals 16 into the bobbin assembly which will be discussed hereinafter.

Figure 5:
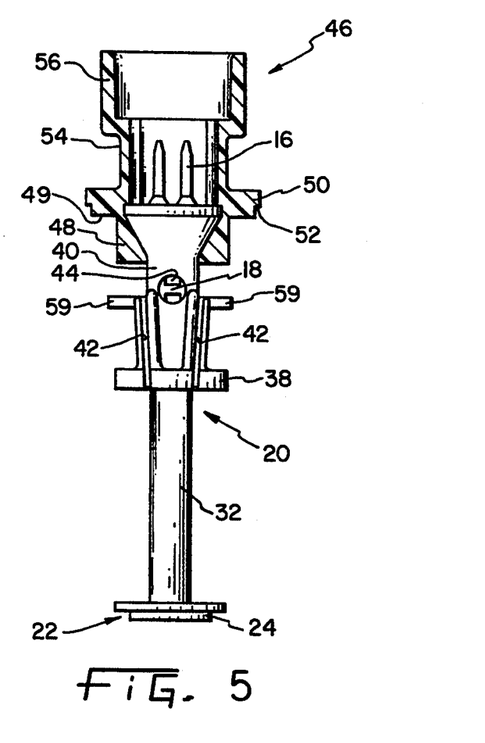
FIG. 5 is view of the bobbin assembly of FIG. 4, particularly showing a sectional view of the customer connector that is molded over the terminal end of the bobbin assembly.
Figure 7:
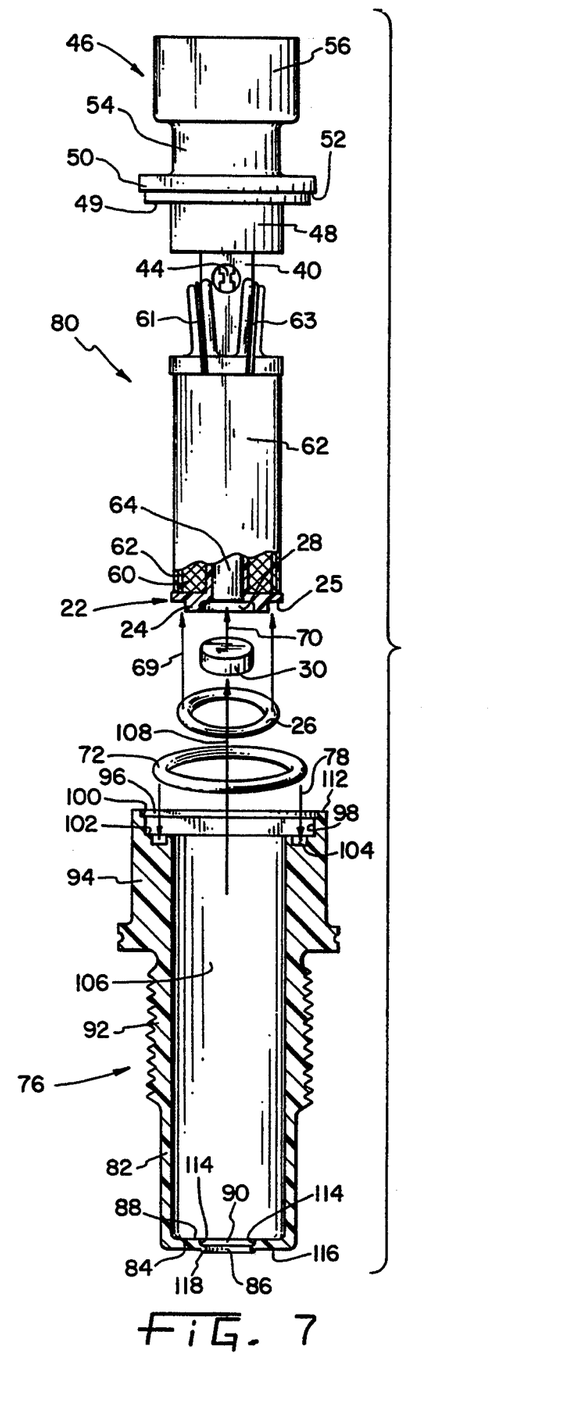
FIG. 7 is a view of FIG. 6, particularly showing the bobbin assembly being inserted into the sensor shell.

Referring now to FIGS. 4, 5, and 7, a bobbin 20 is provided and is preferably molded out of a polyetherimide such as Ultem (TM), commercially available from General Electric. Ultem is known to be a non-hygroscopic material. However, bobbin 20 may be made of other thermoplastic materials. Bobbin 20 includes a front flange 22 having a reduced diameter portion 24 to define a front groove surface 25 upon which a front seal ring 26 rests. The ID of reduced diameter portion 24 defines a pocket 28 for reception of a magnet 30. Bobbin 20 further includes a bobbin barrel portion 32 having a generally cylindrical opening or cavity 34 therein. The back end 35 of cavity 34 is closed-ended to eliminate a possible fluid flow path therethrough. Barrel 32 preferably has a wall thickness ranging from about 0.015 to about 0.025 inch, which is about 0.005–0.010 inch thinner than conventional bobbin barrel thickness. An advantage of this reduced wall thickness is to reduce the internal magnetic air gap in the sensor. Bobbin 20 further includes a rear flange 38 and a shank portion 40 having wire slots 42 integrally molded therein. Shank portion 40 further includes an opening 44 which exposes web portion 18 of stamping assembly 14.

Stamping assembly 14 is preferably insert molded into bobbin 20 to secure terminals 16 in place. In particular, the bobbin mold includes an opening in which stamping assembly 14 rests. The mold is then closed over the stamping, and the plastic is shot into the mold to form the desired bobbin configuration. Web 18 permits assembly 14 to be loaded into a mold in one single piece and thereby eliminates the necessity to align two separate terminals into the mold, thus resulting in more efficient and convenient loading of terminals 16 during molding of the bobbin as well as a reduction of manufacturing costs. Since the insert molded terminals are rigidly captured within bobbin 20, a strain relief for the sensing and output means is built into the sensor assembly.

After assembly 14 is insert molded into bobbin 20, a so-called customer connector piece or harness holder 46 is molded over shank portion 40 of bobbin 20 as shown in FIG. 5. Connector 46 is preferably made of a polyetherimide or other thermoplastic resin material and comprises a front cylindrical portion 48, a flange 50 having radially outer faces 49 and 52, a terminal receiving portion 54, and enlarged diameter portion 56 for receiving terminal housing 58 (FIG. 1) of submersible connector 12. Alternatively, connector 46 may be molded integral with bobbin 20.

Referring to FIGS. 2 and 5, after connector 46 is molded over shank portion 40 of bobbin 20, web portion 18 is sheared out as shown in FIG. 2 in order to separate terminals 16. In addition, as shown in FIG. 3, terminal ends 59 of terminals 16 are simultaneously bent into position during shearing of web 18, in which they are later to receive magnet wire coil ends 61 and 63 and later yet to be soldered.

Figure 3:
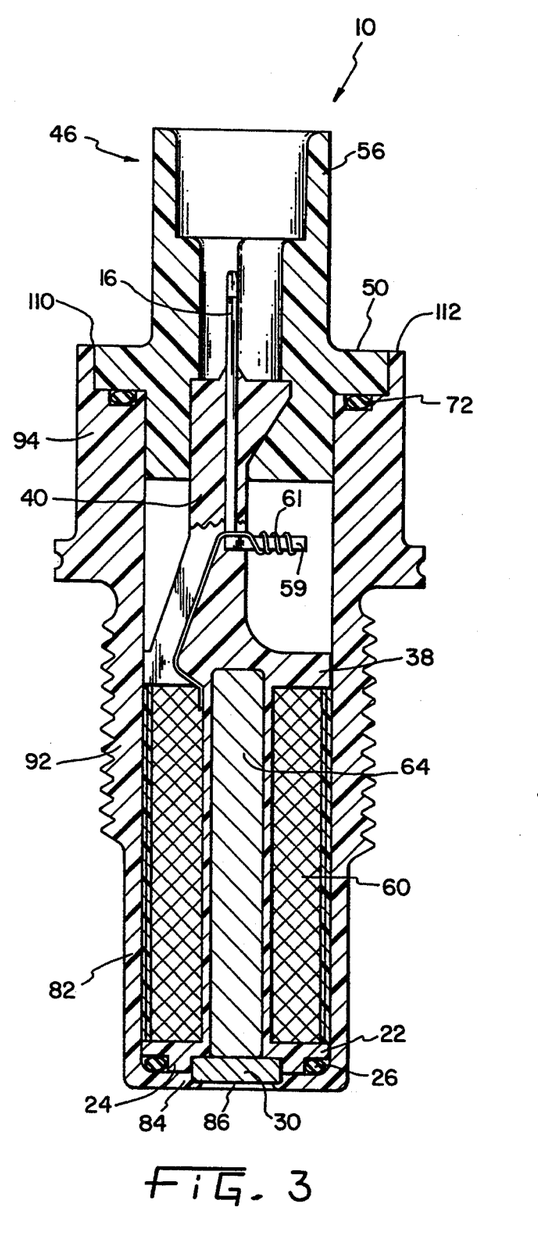
FIG. 3 is a sectional view of the sensor of FIG. 2, taken along line 3—3 in FIG. 2.
Figure 6:
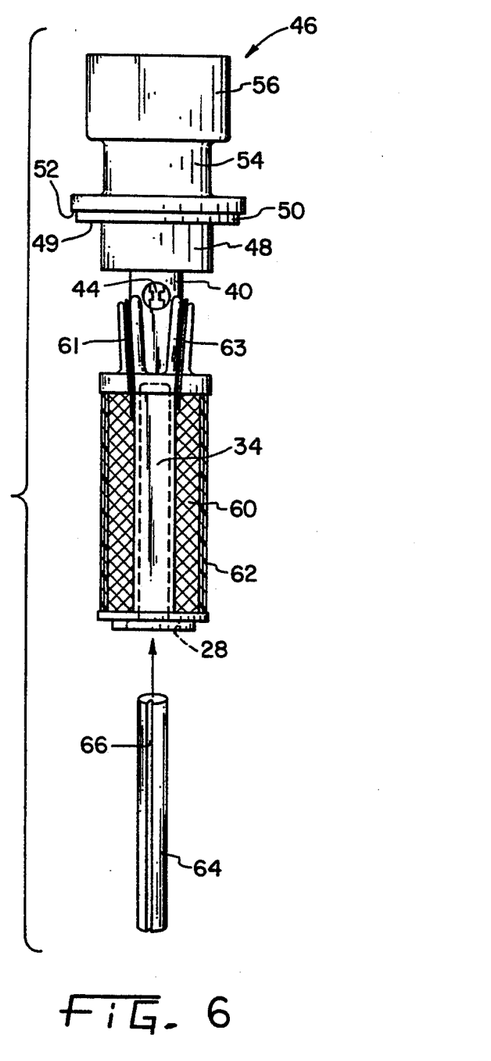
FIG. 6 is an elevational view of the bobbin assembly including the connector overmold and the magnet wire wrapped about the bobbin, and further including a pole piece being inserted into the ID of the bobbin.

Referring primarily to FIGS. 3, 5, and 6, after connector 46 is overmolded onto bobbin shank portion 40, magnet wire 60, preferably ranging from 38 to 40 gauge, is wound into a coil onto bobbin barrel 32 between front flange 22 and rear flange 38. In particular, start and finish wire end portions 61 and 63 of coil 60 are skeined back and forth and then twisted, whereupon they are placed into wire slots 42 and preferably spiral wrapped onto legs 59 of terminal 16. Wire slots 42 offer protection to end portions 61 and 63 in two ways. First, the start wire 61 avoids being nicked as wire 60 is coiled about barrel 32. Second, slots 42 generally protect the skeined wire ends 61 and 63 from damage upon further assembly of the sensor.

Referring to FIGS. 3 and 6, once wire ends 61, 63 are wrapped about terminal legs 59, the wire ends and legs are soldered simultaneously in a dip solder process. Then, coil 60 is wrapped with two layers of a fluorine-containing polymer resin, such as Teflon (TM) tape 62, in order to protect the insulation on magnet wire 60 from damage upon subsequent assembly of sensor 10. It is noted that tape 62 will not degrade at high temperatures and also will not stick to magnet wire 60 thereby permitting magnet wire 60 to expand and contract at its own rate during thermal cycling thereby eliminating the risk of damage due to differential expansion rates. In addition, Teflon tape 62 adequately adheres to itself so that magnet wire 60 is secured in place for subsequent assembly of sensor 10.

Referring now to FIG. 6, a pole piece 64 is inserted into cavity 34 in bobbin 20. Preferably, pole piece 64 is made of a mechanically and magnetically soft ferrous material which is of low coercive force and high permeability, such as AISI 1008, 1010 or 12L14 steel. It should be noted that the outer diameter of pole piece 64 is slightly larger (e.g. 0.002 inch) than the inner diameter of barrel cavity 34 so that pole piece 64 is press fit therein to minimize any air gap between pole piece 64 and the cavity walls. Pole piece 64 includes a groove 66 along the length thereof so that, as pole piece 64 is press fit into closed-ended cavity 34, air within cavity 34 is permitted to escape through groove 66 to permit pole piece 64 to be completely inserted within cavity 34. Alternatively, cavity 34 may include a groove which permits the escape of air. The press fit pole piece, along with a rigid compression of the bobbin assembly during ultrasonic welding which shall be discussed hereinafter, maintains the vibrational and shock capability of a conventional encapsulated sensor.

As shown in FIG. 7, after the pole piece has been inserted into bobbin 20, a front seal ring 26 is stretch fit over front groove 24 onto groove surface 25 of bobbin 20 as shown by arrows 69. Thereafter, magnet 30 is inserted into magnet pocket 28 as shown by arrow 70. Preferably, magnet 30 is a rare earth such as samarium cobalt. Upon inserting magnet 30 into pocket 28, the bobbin assembly 80 is formed and ready to be housed by an outer sensor shell 76. Before sealing, rear seal ring 72 is mounted onto sensor shell 76 in the direction indicated by arrow 78, as shown in FIG. 7. Seal rings 26 and 72 are preferably made from fluorosilicone, which maintains structural integrity and sealing properties from minus 100° F. up to 350° F.

Hollow sensor shell 76 is made of the same material as connector 46 and generally comprises a front cylindrical portion 82 having a front wall 84 with an opening 86 therein. The inner surface 88 of front wall 84 includes a pocket 90 in communication with opening 86. Pocket 90 is designed to receive a portion of magnet 30 upon assembly. Sensor shell 76 further includes a generally threaded cylindrical portion 92 and an enlarged integral rear portion 94 resembling a nut. However, it is recognized that the outer sensor shell may be of any desired configuration and still house a common bobbin assembly 80. Rear portion 94 includes a rear opening 96 having a inner diameter surface 98 defining a shoulder 100. As shown in FIG. 7, rear portion 94 further includes an integral inner flanged portion 102 having a generally annular grooved surface 104 therein for reception of rear seal ring 72. Flanged portion 102 defines a reduced diameter opening 106 that extends for most of the length of shell 76.

Sensor shell 76 is mounted over bobbin assembly 80 as shown by arrow 108 until surface 52 of connector flange 50 comes in contact with shoulder 100. As this occurs, flange 50 is ultrasonically welded to the shear land or wall of inner diameter surface 98, thereby creating a shear joint 110 (FIGS. 2 and 3) which is 360° of melted plastic so that flange 50 and rear shell wall 112 become substantially integral. Simultaneously, front O-ring 26 is compressed between flange 22 and inner surface 88 of front wall 84, and rear O-ring 72 is compressed between rear seal groove 104 and the underside 49 of flange 50. Preferred dimensions for the O-rings and grooves are such that when front O-ring 26 is compressed within its normal band, the sensor seals up to 60 psi air pressure therein.

The compression of front seal ring 26 is additionally maintained at elevated temperatures since the coefficient of expansion of bobbin 20 is preferably greater than that of sensor shell 76 due to the lower glass content of the bobbin material as compared to that of the sensor shell.

It is recognized that the matching of length dimensions on shell 76 and connector 46 enable simultaneous compression of front 26 and rear 72 seal rings during welding. In other words, the distance from the front face of front flange 22 of bobbin 20 to the underside face 49 of connector flange 50 corresponds to the distance from front inner wall surface 88 of shell 76 to flange surface 102 containing rear groove 104 so that both O-rings are sealingly compressed upon assembly. It is further recognized that the ultrasonic shear weld alone creates the primary seal in the rear portion of the sensor and that rear seal ring 72 is considered a secondary seal. In fact, an adequate seal may be achieved in some cases without utilizing rear seal ring 72.

Upon mounting sensor shell 76 over bobbin assembly 80, magnet pocket 90 receives a portion of magnet 30, with the remaining portion of magnet 30 being housed within pocket 28 in bobbin assembly 80. This reduces the magnetic air gap between coil wires 60 and magnet 30 since the magnetic pocket is somewhat indented into the front of front bobbin flange 22 and thus increases the strength of the magnetic circuit. In addition, dual magnet pockets 28 and 90 assure proper centering of magnet 30, which is especially important for position sensing applications.

A feature of the present invention is that opening 86 in front shell wall 84 permits magnet 30 to be exposed through shell housing 76. Because of the stack up of tolerances of bobbin assembly 80, sensor shell 76, magnet 30 and magnet pockets 28 and 90, there is an air gap of up to about 0.008 inch between the inside wall 114 of magnet pocket 90 and the forward face of magnet 30. In order to eliminate this air gap, wall 84 of the sensor shell is heated to just above its glass transition temperature, i.e. about 419° F. for Ultem, whereupon wall 84 is staked with a cold tool until the forward face of magnet 30 engages inside wall 114 of pocket 90. In addition, the hot air/cold stake process forces magnet 30 into intimate contact with the forward end of pole piece 64 as well as rigidly captures the magnet within the two pockets. As shown in FIG. 7, the outer surface 116 of wall 84 includes a generally annular lip portion 118 about opening 86. Lip 118 is provided to aid engagement of magnet 30 during the staking process and is collapsed as a result thereof.

Opening 86 in front wall 84 of sensor shell 76 is preferably about 0.015 inch in thickness. In variable reluctance sensor applications, generally the smallest air gap between a reluctor wheel and the end of the sensor is 0.020 inch. This is generally because of tolerance stack-ups in machining the reluctor wheel and other system components. In addition, the reluctor wheel is on a radius so that the closest the reluctor wheel and the sensor come in proximity (0.020 inch) is at the midpoint of the sensor. Thus, 0.015 inch of the 0.020 inch gap can be invaded by the sensor without touching the gear or reluctor wheel, thereby minimizing the working air gap between the reluctor wheel and the magnet. This results in a 25% to 40% increase in the output over a conventional sensor with a closed-ended housing.

Figure 8:
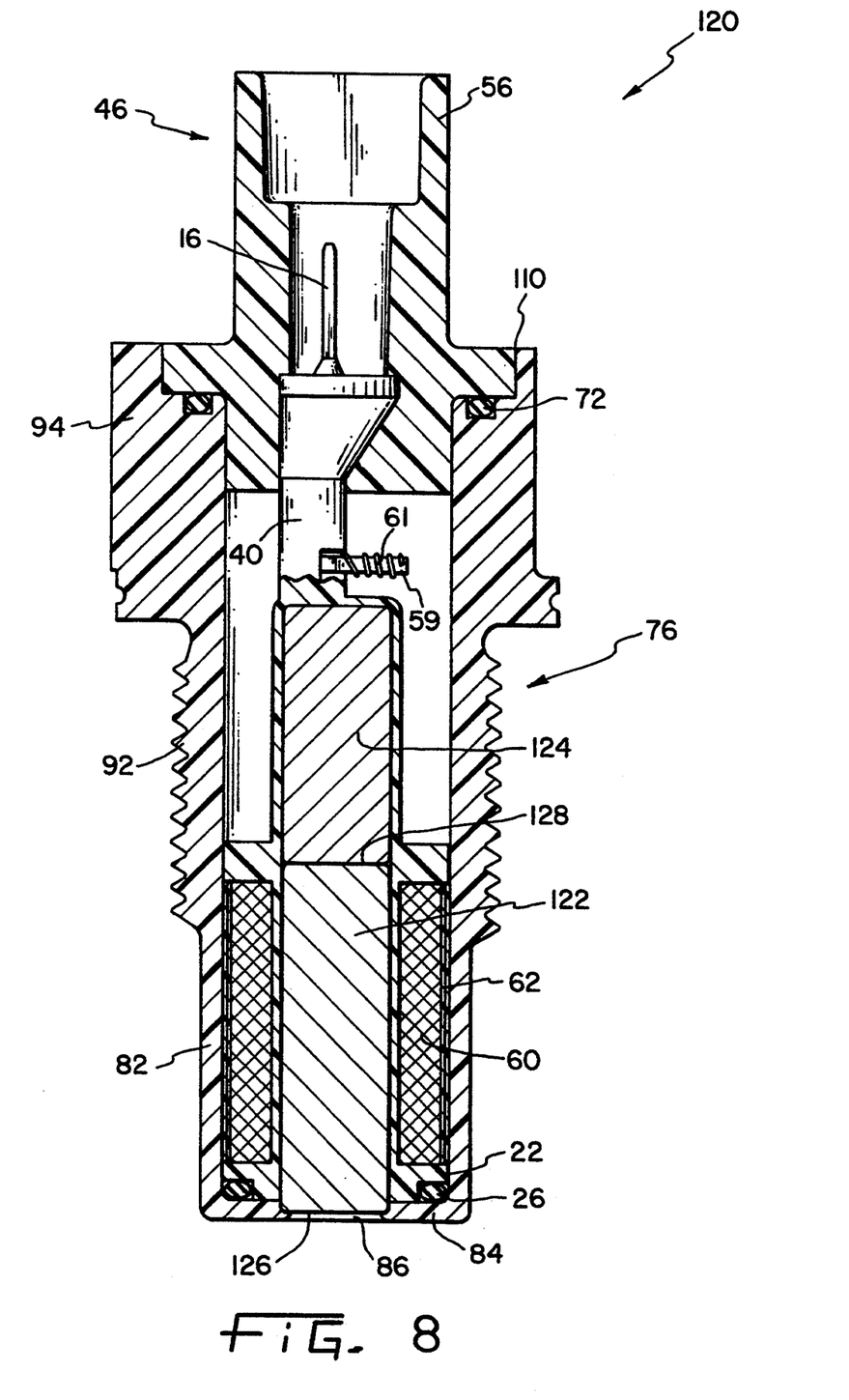
FIG. 8 is a vertical sectional view of an alternative embodiment of the variable reluctance sensor shown in FIGS. 1-7, particularly showing the magnet and pole piece in alternative locations.

Referring now to FIG. 8, as an alternative embodiment to the sensor shown in FIGS. 1–7, there is shown a sensor 120 which is substantially similar to sensor 10 except that pole piece 122 and magnet 124 are in reverse order within the bobbin. In particular, end 126 of pole piece 122 is exposed through opening 86 in front wall 84 of the sensor shell. Magnet 124, which is located rearwardly within the bobbin, is in contact with pole piece 122 at 128. Although the magnet and pole piece orientation has been changed in this embodiment, the general packaging principles discussed heretofore are applicable here as well.

Figure 9:
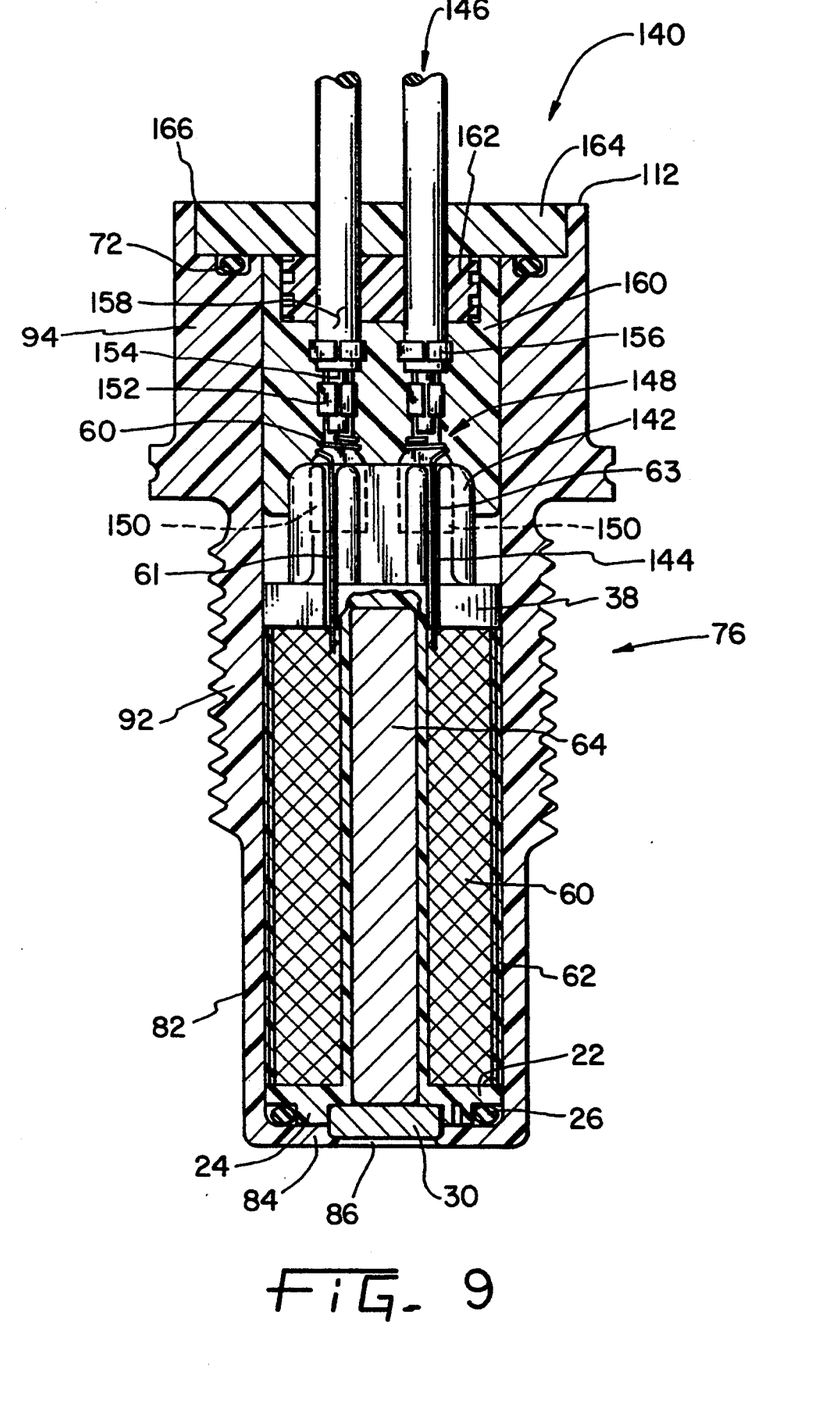
FIG. 9 is a vertical sectional view (with the bobbin in partial section) of an alternative embodiment of the sensor shown in FIGS. 1-7, particularly showing a leaded sensor design.

Referring now to FIG. 9, another embodiment of the present invention is shown. In this embodiment, a so-called "leaded sensor" 140 is shown and includes a bobbin that is similar to the bobbin shown previously except that the rear end portion 142 is substantially squared-off and includes a pair of openings for receiving the ends 150 of separate terminals 148 via a press fit. As shown, ends 61 and 63 of magnet wire 60 are wrapped around respective terminals 148 and soldered. A pair of electrical leads 146 are connected to respective terminals 148 by crimping tangs 152 and 156 which are integral parts of each terminal 148. The first pair of tangs 152 are crimped over a respective conductor 154 of lead 146, and the second pair of tangs 156 are crimped over insulation 158 of respective lead 146.

After leads 146 are securely crimped in place, a harness holder 160 is overmolded onto rear portion 142 of the bobbin. Harness holder 160 holds leads 146 in place and includes a cavity in its rear portion to accept a custom seal 162, preferably made of fluorosilicone. A rear flange piece 164, preferably made of the same material as shell 76, is then ultrasonically welded to shell 76 as described previously to create a shear joint 166 which is 360° of melted plastic so that shell wall 112 and flange piece 164 become substantially integral. As flange piece 164 is ultrasonically welded in place, front 26 and rear 72 seals are compressed as well as custom seal 162 around each lead 146 and within the harness holder cavity to create a fluid-tight seal therebetween. It is recognized that both custom seal 162 and flange piece 164 may be of a variety of sizes and configurations as desired. For example, a single lead may be desired instead of two leads as shown, thereby causing the custom seal and flange piece to each have only one opening instead of two.

In accordance with yet another aspect of the invention, the packaging concepts described herein could be applied to other tubular packaged sensors or switches in addition to variable reluctance sensors. For example, the following is a list of some other types of electronic sensors that may be packaged in accordance with the principles of the present invention:

Hall Effect (Position, Proximity, Speed detection)
Magneto Resistive (Position, Speed)
Magneto Restrictive (Position)
Temperature
Potentiometer (Position)
Capacitive (Proximity, Displacement)
Inductive (Proximity, Displacement)
Eddy Current (Proximity, Displacement)
Linear and Rotary Differential Transformer (Displacement).

It will be appreciated that the foregoing is presented by way of illustration only, and not by way of any limitation, and that various alternatives and modifications may be made to the illustrated embodiment without departing from the spirit and scope of the invention.

What is claimed is:

1. A sealed variable reluctance magnetic sensor, comprising:
   a bobbin including a barrel portion having a cavity therein, a rear end and a front end including a front flange;
   a pole piece provided in said cavity;
   a magnet secured to said bobbin adjacent said pole piece, said magnet being disposed in front of said pole piece at the front end of said bobbin;
   an electric coil wound around said barrel portion and electrically connected to output conductors for transmitting an electrical signal to an output device;
   an outer hollow shell surrounding said bobbin and including an open rear end portion and front end portion having a front wall with an opening therein adjacent said magnet to permit said magnet to be exposed therethrough;
   an elastomer front seal compressed between said front flange and said front end portion for sealing said electric coil from fluid flow through said opening; and
   a rear piece covering said open rear end portion, wherein said rear piece includes a flanged portion that is ultrasonically welded to an inner diameter surface of said rear end portion of said outer shell, thereby completely closing and sealing said open rear end portion from fluid flow therethrough.

2. The sensor of claim 1, wherein said rear piece comprises a harness holder that is molded over said rear end of said bobbin.

3. The sensor of claim 1, wherein said rear piece and said bobbin form a single, integrally molded component.

4. The sensor of claim 1, wherein said rear piece covering said open rear end portion of said hollow shell includes a rear piece opening therein and a pair of electrical output leads extending through said rear piece opening and secured to said rear end of said bobbin, wherein ends of said electric coil are electrically secured to said electrical leads, and wherein a lead seal is disposed between said rear piece and said bobbin and being axially compressed by said rear piece for sealing said rear piece opening from fluid flow therethrough, said leads passing through and being sealed against said lead seal.

5. A sealed variable reluctance magnetic sensor, comprising:
- a bobbin including a barrel portion having a blind cavity therein, a rear end and a front end including a front flange;
- a magnet disposed in said cavity;
- a pole piece provided in said cavity adjacent said magnet, said magnet being disposed in front of said pole piece at said front end of said bobbin;
- an electric coil wound about said barrel portion and electrically connected to output conductors for transmitting an electrical signal to an output device;
- an outer hollow shell surrounding said bobbin and including an open rear end portion having an inner shoulder surface and a front end portion having a front wall with an opening therein adjacent said magnet to permit said magnet to be exposed therethrough;
- an elastomer front seal compressed between said front flange and said front wall for sealing said electric coil from fluid flow through said opening; and
- a rear piece covering said open rear end portion, wherein said rear piece includes a flanged portion that is ultrasonically welded to said inner shoulder surface, thereby completely closing and sealing said open rear end portion from fluid flow therethrough.

6. A sealed variable reluctance magnetic sensor, comprising:
- a bobbin including a barrel portion having a cavity therein, a rear end and a front end including a front flange;
- a pole piece provided in said cavity;
- a magnet secured to said bobbin adjacent and in front of said pole piece at said front end of said bobbin;
- an electric coil wound around said barrel portion;
- an outer hollow shell surrounding said bobbin and including an open rear end portion and a front end portion having a front wall with a front opening therein adjacent said magnet to permit said magnet to be exposed therethrough;
- a rear piece covering said open rear end portion of said hollow shell and including a rear piece opening therein, wherein said rear piece includes a flanged portion that is ultrasonically welded to an inner diameter surface of said rear end portion thereby sealing said open rear end portion from fluid flow therebetween;
- a pair of electrical output leads extending through said rear piece opening and secured to said rear end of said bobbin, wherein ends of said electric coil are electrically secured to said electrical leads;
- an elastomer lead seal disposed between said rear piece and said bobbin and being axially compressed by said rear piece for sealing said rear piece opening from fluid flow therethrough, said leads passing through and being sealed against said lead seal; and
- an elastomer front seal compressed between said front flange and said front end portion for sealing said electric coil from fluid flow through said front wall opening.

* * * * *